Inventor
Homer A. Lozeau

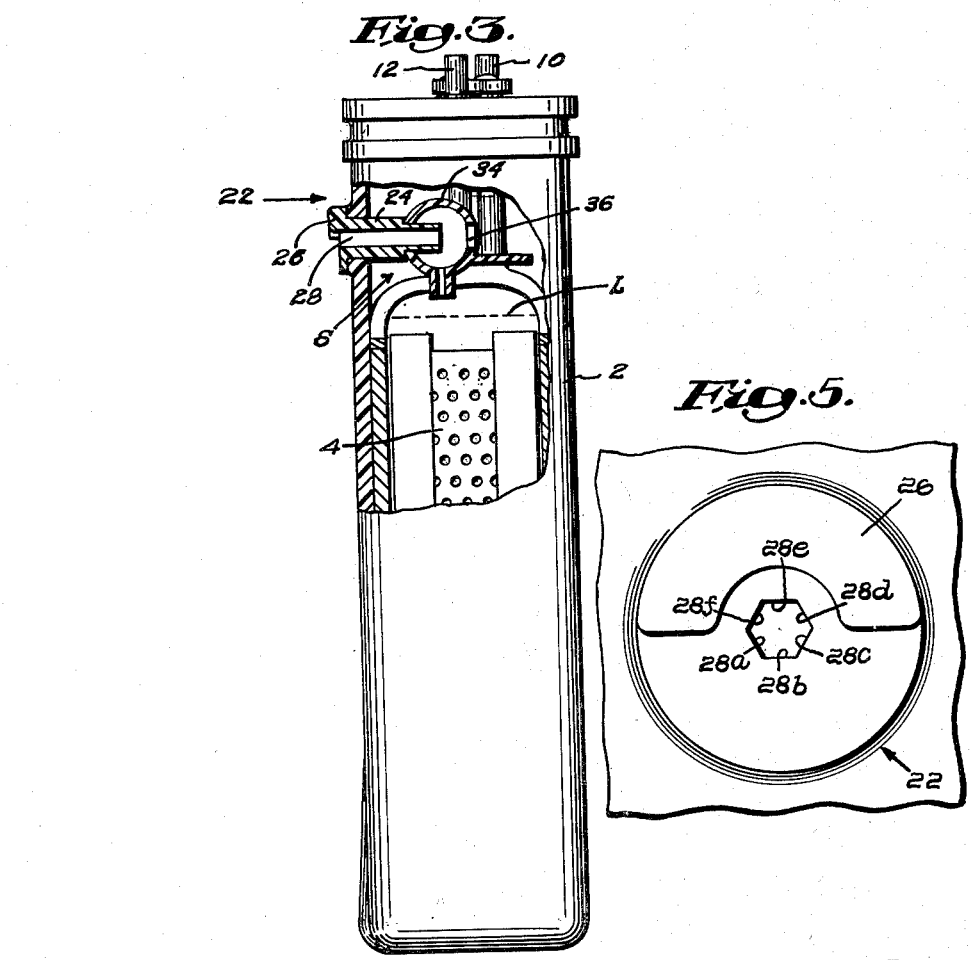
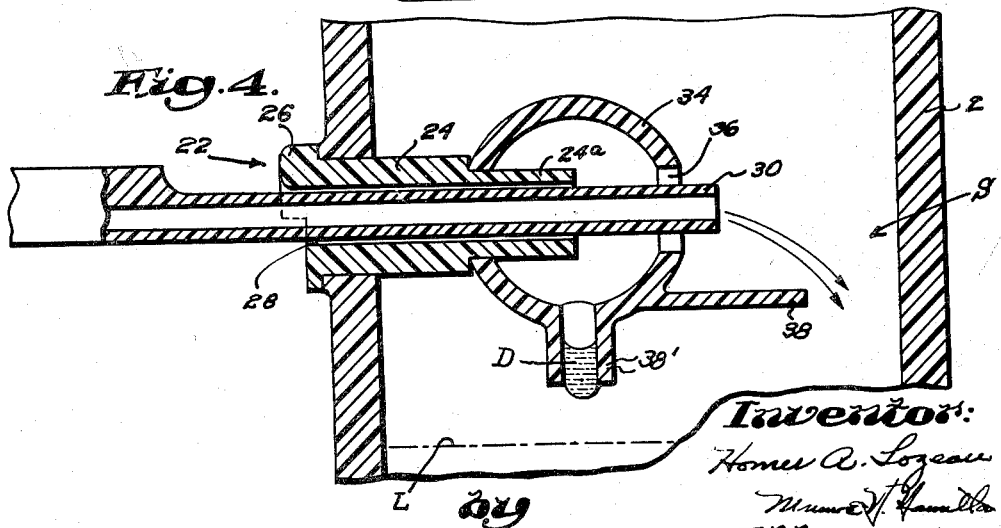

United States Patent Office 3,179,539
Patented Apr. 20, 1965

3,179,539
NON-SPILLABLE STORAGE BATTERY CONTAINER WITH COMBINATION MEANS FOR VENTING AND FILLING
Homer A. Lozeau, Worcester, Mass., assignor to Koehler Manufacturing Company, Marlboro, Mass., a corporation of Massachusetts
Filed Nov. 17, 1960, Ser. No. 69,855
5 Claims. (Cl. 136—177)

This invention relates to storage batteries and in particular to storage batteries of the class employed, for example, in energizing a miner's electric cap lamp. In storage batteries of this type it is necessary to add small amounts of distilled water from time to time in order to maintain the battery components in satisfactory working condition, and the present invention is particularly concerned with an improved method and means for periodically carrying out battery filling operations in a miner's cap lamp storage battery.

The step of introducing distilled water into a battery necessitates an inlet opening in the battery casing, as well as a vent aperture through which air and other gas may be expelled during filling and charging of the battery. In conventional battery construction, it has been the practice to employ two openings. One opening functions as an inlet opening. This opening must be closed by a plug when not in use and the plug must be removed each time a filling operation is carried out. The other opening functions as a small vent aperture which is ordinarily left open. If this conventional form of battery casing is tipped over, or upended, a quantity of fluid may in some cases spill out of the venting aperture. In other cases the venting aperture may become blocked and the required venting effect is prevented which may lead to troublesome consequences.

It is a chief objective of the present invention to improve storage battery construction and to provide a more efficient method and means for carrying out the battery filling operation in a miner's cap lamp storage battery. Another specific object is to devise a battery casing construction in which the use of a plugged opening is eliminated and a non-spillable feature is provided so that spilling of battery fluid may be prevented regardless of the position which is assumed by the battery during use.

With these general objects in mind, I have conceived of a simplified method of carrying out the battery filling operation in which filling and venting are carried out through a single battery casing aperture and the single aperture is combined with a novel fluid conduit and trap assembly in such a way that spilling of battery fluid is completely prevented. Thus the need for using a plug or other closure device is obviated and the possibility of clogging or blocking of the vent aperture is avoided.

As one preferred means of carrying out the battery filling operation of the invention, I have devised a combination venting and filling member which is adapted to fit into a small aperture formed through the sidewall of a battery casing. When thus installed the filling member is further adapted to receive a nozzle of a battery filling device therethrough. At such times as the nozzle is present in the filling device, dual passageways are formed by means of which distilled water may be led into the battery in one direction, and simultaneously air or other gases may be conducted out of the casing in an opposite direction. At other times when the nozzle of the filling device is removed, an air or gas vent is always present and no plug is necessary. An important feature of the combination venting and filling member is a special enclosure trap body which is arranged to surround a tubular portion of the filling member within the battery casing in such a manner that spilling of fluids is completely avoided.

The nature of the invention and its other objectives and novel features will be more fully understood and appreciated from the following description of a preferred embodiment of the invention selected for purposes of illustration and shown in the accompanying drawings, in which:

FIG. 3 is an end elevational view also broken away to show the combination venting and filling means of the invention, as well as the battery plates and separator elements;

Figure 1:
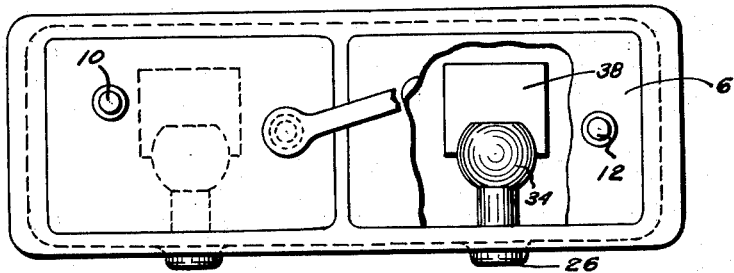
FIG. 1 is a plan view of a storage battery constructed in accordance with the invention.

FIG. 4 is an enlarged cross sectional view further illustrating the combination venting and filling member in an operative position with a nozzle of a filling device inserted therein to carry out a filling operation; and FIG. 5 is a detail elevation view of a tubular component of the combination venting and filling member illustrating the hexagonal form of internal passageway of the tubular member.

Referring more in detail to the drawings, numeral 2 denotes a battery casing which is preferably comprised of a translucent plastic material. Secured within the battery casing 2 are battery plates 4 and electrolyte of well-known character. It will be understood that usually a small quantity of electrolyte is to be maintained at a desired level in the battery above the plates and a line indicating this level is indicated at L in FIGS. 2, 3 and 4. Above the level L is an air space 5. The battery casing 2 is closed at its top side by a cover element 6 which is cemented into a recessed portion 8 of the casing as suggested in FIG. 2. Supported through the cover element 6 are terminal posts as 10 and 12 which are electrically connected at their lower extremities to battery plates 4 (FIG. 3).

Figure 2:
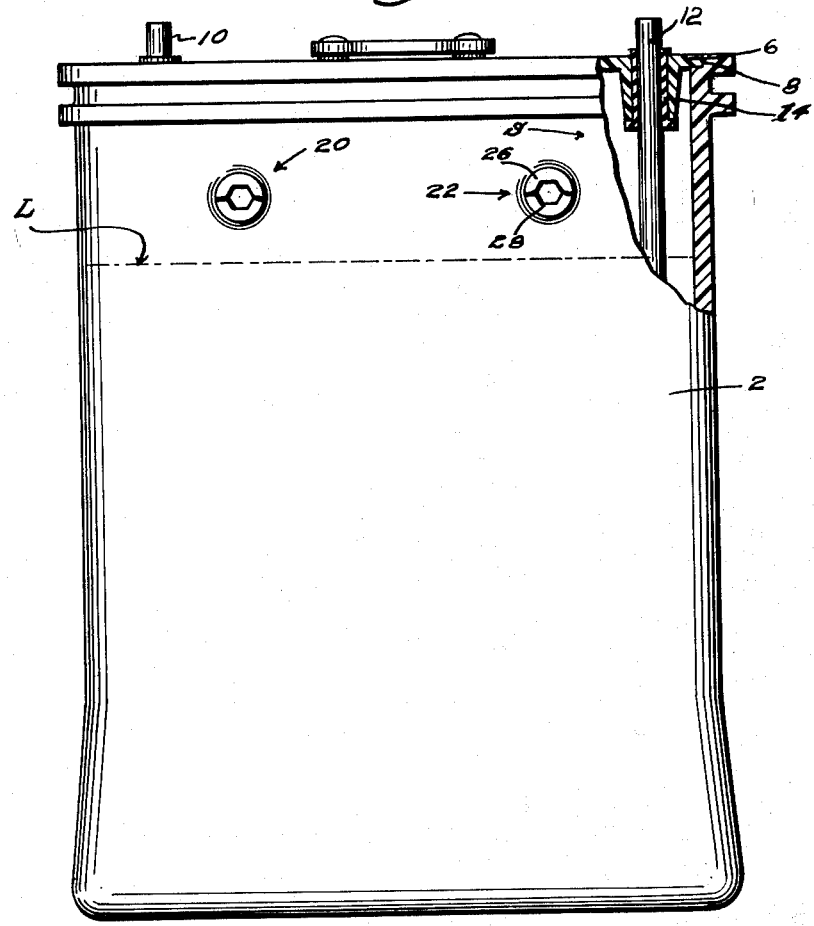
FIG. 2 is a view in side elevation of the storage battery which is broken away at one side to further illustrate the level of a battery fluid in the casing, as well as portions of a cover and terminal post assembly.

A further feature of the terminal posts is novel sealing means for maintaining the terminal posts in sealed relationship with respect to the edges of respective holes in the cover element 6 through which the terminals extend. The sealing means consist of resilient bushings which surround those portions of the terminal posts which are adjacent to the edges of the holes in the battery cover 6. One of these bushings 14 is shown in FIG. 2 and is designed with an inner diameter less than the outer diameter of the terminal post 12 so that the bushing is required to be expanded to receive the terminal post therethrough. Thus the bushing is at all times resiliently engaged on the post to exert a sealing action. The size of the bushing is further chosen such that the outer diameter of the bushing when engaged over the terminal post in an expanded state, exceeds slightly the diameter of the hole in the cover 6. Thus the bushing must be compressed to fit into the hole and an effecitve outer seal is realized.

In accordance with the invention, I combine with the battery casing described, special venting and filling members, each of which includes a tubular conduit portion and a spherical trap. As shown in FIG. 2 these venting and filling members are located through openings formed in the sidewall of the battery casing and are indicated by numerals 20 and 22. Member 20 communicates with one battery cell and member 22 communicates with a second battery cell.

FIGS. 3 and 4 illustrate the member 22 in greater detail and show this member in a permanently installed position in the battery casing 2. Included in the member 22 is a tubular conduit portion 24 which extends transversely through an opening in the sidewall of the casing 2. This conduit portion is formed with an enlarged outer cap adapted to overlie the external surface of the casing. The inner section of member 24 may be cemented, threaded, or otherwise secured to the casing. The cap portion is further formed with a semi-circular overhang 26 which forms a protective shoulder for an opening 28 extending through the tubular conduit portion 24.

An important feature of opening 28 is its cross sectional configuration of preferably hexagonal form as defined by the intersection of a plurality of polygonal faces 28a, 28b, 28c, 28d, 28e, 28f. It will be apparent that by inserting a cylindrical nozzle 30 of a filling device in the opening 28 as suggested, for example, in FIG. 4, and by choosing an outer diameter for the nozzle 30 which corresponds to the distance between any two opposite faces of the opening 28, there will be arrived at a plurality of small V-shaped passageways. Through these passageways air and other gases may, I find, be vented from the air space S and out through the casing 2 in a suitably restricted manner.

I have found that a spacing, for example, of one-eighth of an inch across the flats of the hexagonal opening 28 provides an aperture which is large enough to receive the nozzle of a filling device and provide for venting, and yet prevent any appreciable entrance of dust or other foreign matter. The protective shield or overhang 26 also cooperates with the small size of the aperture to reject particles of foreign matter and thus no plug is required, and the aperture, without the nozzle 30 inserted, may also serve as a satisfactory vent for gases given off during battery charging operations.

At its inner end the tubular conduit portion 24 is reduced at 24a and has mounted therearound the second major component of the invention consisting of a spherical enclosure or trap body 34. It is contemplated that this spherical trap may be rigidly secured by cementing or other fastening means so that it constitutes in effect one continuous piece with the conduit section 24. At a point diametrically opposite the point of entrance of the reduced end 24a, the spherical body is formed with a vent aperture 36 and this aperture is of a size designed to exceed the outer diameter of the nozzle 30 of a filling device such as that shown in FIG. 4. By means of this arrangement it will be evident that the nozzle 30 may extend through the spherical body in spaced relation to it so that a vent passageway remains all the way around the nozzle through which gases or air in the space S may be conducted into the spherical body 34. From the spherical body the gases may pass through the tubular conduit 24 either when the nozzle 30 is inserted, or when it is removed.

It will be observed that the nozzle 30, in the arrangement shown in FIG. 4, extends well beyond the venting aperture 36 of the spherical trap 34, so that distilled water or other fluid may be readily conducted into the space S to flow down around the plates of the battery.

The spherical trap 34 is further provided with a baffle plate 38 which extends transversely inwardly beyond the venting aperture 36 and which is of sufficient size, as may be more readily seen from an inspection of FIGS. 1 and 4, to substantially shut out liquids or droplets of moisture tending to splash up from the liquid level L during battery charging operations and at which time the nozzle 30 is removed from the battery. With the venting aperture 36 cooperating with the spherical shape of the trap, the vapor or droplets of fluid material which enter the venting aperture 36 tend to become trapped within the spherical body and to provide for releasing amounts of liquid thus collected, I further provide a bottom outlet 38'.

From the foregoing description of the invention, it will be seen that I have devised a unique combination filling and venting member which may be employed in a single battery aperture to receive a nozzle of a filling device during a battery filling operation. At such time air and other gases may be vented from the battery in a satisfactory manner.

The arrangement of the spherical trap is especially effective in collecting droplets of moisture since any liquid material in the form of spray or bubbles occurring during the charging operation will be prevented from entering the vent opening 36 by the baffle 38 to a very large extent. What little moisture may enter through the opening 36 will be collected on the inner walls of the spherical body 34 and also on the outer surface of the member 24a. While it is possible for air or gas to travel out through the opening 28, there is a strong possibility for any moisture to collect on the inner walls of the spherical body 34 and then run down and drain out of the outlet 38' of the spherical body.

The size of the drain hole in the outlet member 38' has been chosen so that capillary attraction will hold a drop of moisture in the hole. This functions to prevent material from entering into the spherical body.

Finally, it will be appreciated that the arrangement of the spherical body in the space S is such that regardless of the position in which the battery may be, there will be an effective prevention of spilling while venting can still take place.

While I have shown the spherical body as a preferred arrangement, I may desire to utilize other shapes of enclosure bodies and I may wish to modify the other components of the combination filling and venting member in various respects within the scope of the invention as defined by the appended claims.

I claim:

1. In combination a storage battery of the class described comprising a casing, battery plates and a fluid body of electrolyte contained in the casing and normally overlying the tops of the battery plates, said casing having an aperture therein located above the level of the electrolyte, conduit means positioned in said aperture and extending within said casing for receiving a filling tube of circular cross section conducting battery filling material into the casing at a point above the electrolyte, said conduit means being internally defined by a plurality of angularly disposed longitudinally extending walls, whereby longitudinal gas passages are formed between the internal wall of said conduit and said tube when said filling tube is positioned in said conduit means, and a water and vapor trap mounted upon and enclosing the inner end portion of said conduit for preventing the escape of electrolyte in droplets and vapor outwardly through said conduit, said trap being formed with an opening aligned with the passage in the conduit means, said opening being of greater diameter than the diameter of the opening in said conduit to permit the passage of the filling tube therethrough for discharge by the filling tube outwardly beyond the trap.

2. The structure of claim 1 characterized in that the trap is provided with a drain passage at its bottom portion and a baffle plate is fixed to the trap between the venting aperture and the drain passage and projects laterally at each side thereof.

3. The structure of claim 1 characterized in that the conduit means is formed with an outwardly projecting wall portion overlying the external surface of the casing about the area defining the aperture therein.

4. In combination a storage battery of the class described comprising a casing, battery plates and a fluid body of electrolyte contained in said casing and normally overlying the tops of the battery plates, said casing being formed with an aperture at one side thereof, a combination filling and venting trap supported internally of said casing, a conduit located within said aperture and terminating within said trap, a longitudinally extending groove formed in the wall of said conduit, said trap being formed with a venting aperture generally axially aligned with the axis of the conduit, and of a dimension greater than the diameter of said conduit, whereby a battery filling tube projecting through said conduit may project through the aperture in said trap for discharge beyond said trap into said casing, and a drain passage in the bottom wall of said trap, said drain passage being restricted in dimension to provide a capillary discharge of fluid accumulated in said trap.

5. In combination a storage battery of the class described comprising a casing, a battery plates and a fluid body of electrolyte contained in said casing and normally overlying the tops of the battery plates, said casing being formed with an aperture at one side thereof, a spherical filling and venting trap supported internally of said casing, a conduit located within said aperture and terminating within sad trap, said conduit having its inner wall defined by a plurality of angularly arranged connected walls, said trap being formed with an enlarged venting aperture generally axially aligned with the axis of the conduit, whereby a battery filling tube projecting through said conduit may project through the aperture in said trap for discharge beyond said trap into said casing, a drain passage in the bottom wall of said trap, said drain passage being restricted in dimension to provide a capillary discharge of fluid accumulated in said trap, and a baffle plate fixed to said spherical trap below said aperture and extending transversely outward from the trap to provide a guard for the trap during battery charging operation.

References Cited by the Examiner
UNITED STATES PATENTS

| | | | |
|---|---|---|---|
| 679,050 | 7/01 | Girouard | 136—162.1 |
| 1,201,074 | 10/16 | Mortimer et al. | 135—177.22 |
| 1,321,960 | 11/19 | Wheat | 136—177.2 |
| 2,472,852 | 6/49 | Lighton | 135—177.6 |
| 2,810,776 | 10/57 | Brill et al. | 135—162 |

FOREIGN PATENTS

| | | |
|---|---|---|
| 671,592 | 12/29 | France. |
| 753,370 | 10/33 | France. |

JOHN H. MACK, *Primary Examiner.*

JOHN R. SPECK, *Examiner.*